(12) United States Patent
Sawdon et al.

(10) Patent No.: US 8,204,863 B2
(45) Date of Patent: Jun. 19, 2012

(54) MULTI-PHASE FILE SYSTEM RESTORE WITH SELECTIVE ON-DEMAND DATA AVAILABILITY

(75) Inventors: Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/643,635

(22) Filed: Dec. 21, 2009

(65) Prior Publication Data
US 2011/0153561 A1   Jun. 23, 2011

(51) Int. Cl.
*G06F 17/30* (2006.01)
*G06F 11/00* (2006.01)

(52) U.S. Cl. .......................................... 707/679; 714/15
(58) Field of Classification Search ........... 707/674–686
See application file for complete search history.

(56) References Cited

U.S. PATENT DOCUMENTS

| | | | |
|---|---|---|---|
| 6,067,636 A * | 5/2000 | Yao et al. ........................ 714/15 |
| 6,154,852 A | 11/2000 | Amundson et al. | |
| 6,505,216 B1 | 1/2003 | Schutzman et al. | |
| 6,718,352 B1 * | 4/2004 | Dang et al. ..................... 707/611 |
| 7,024,527 B1 * | 4/2006 | Ohr ................................ 711/161 |
| 7,035,881 B2 * | 4/2006 | Tummala et al. .............. 707/639 |
| 7,073,036 B2 * | 7/2006 | Furuya et al. .................. 711/162 |
| 7,103,740 B1 | 9/2006 | Colgrove et al. | |
| 7,234,077 B2 * | 6/2007 | Curran et al. ................... 714/15 |
| 7,398,365 B1 | 7/2008 | Hardman | |
| 7,620,843 B2 * | 11/2009 | Zohar et al. ..................... 714/5.1 |
| 7,725,704 B1 * | 5/2010 | Beaverson et al. ............... 713/2 |
| 7,788,234 B2 * | 8/2010 | DePue et al. ................... 707/681 |
| 7,809,693 B2 * | 10/2010 | Lango et al. ................... 707/679 |
| 2003/0177324 A1 * | 9/2003 | Timpanaro-Perrotta ...... 711/162 |

(Continued)

FOREIGN PATENT DOCUMENTS
CA   2384020 A1   11/2003
(Continued)

OTHER PUBLICATIONS
Feng, et al.; "High Performance Virtual Backup and Archive System"; INSPEC/Springer-Verlag; vol. 3993, pp. 671-678, 2006.

(Continued)

*Primary Examiner* — Robert Timblin
(74) *Attorney, Agent, or Firm* — Mitch Harris, Atty at Law, LLC; Andrew M. Harris; Matthew W. Baca

(57) ABSTRACT

A selective restore technique for restoring file systems within computer systems provides on-demand access during the restore process, while preventing users from slowing the restore process by generating random accesses to files that have not yet been restored, early in the restore process. The restored files are grouped into multiple groups of files, which correspond to multiple phases of the restore process. On-demand requests may be locked out for some or all users during the first one or more phases of the restore, while they are permitted for the subsequent phases, ensuring that critical files needed by all users will be available before the backup process is interrupted by on-demand accesses. The groups are generally organized by elapsed time since last access or modification, and may be organized at restore time or during periodic back-up operations so that the files may be similarly organized in the backup media.

21 Claims, 3 Drawing Sheets

U.S. PATENT DOCUMENTS

| | | | |
|---|---|---|---|
| 2003/0182301 A1* | 9/2003 | Patterson et al. | 707/102 |
| 2004/0267787 A1* | 12/2004 | Huras et al. | 707/100 |
| 2004/0267822 A1* | 12/2004 | Curran et al. | 707/200 |
| 2005/0193239 A1* | 9/2005 | Shackelford | 714/7 |
| 2006/0143501 A1* | 6/2006 | Tormasov et al. | 714/5 |
| 2007/0168401 A1* | 7/2007 | Kapoor et al. | 707/202 |
| 2007/0294320 A1 | 12/2007 | Yueh et al. | |
| 2008/0177801 A1 | 7/2008 | Garimella et al. | |

FOREIGN PATENT DOCUMENTS

| | | |
|---|---|---|
| WO | WO-2007002397 A2 | 1/2007 |
| WO | WO-2007103289 A2 | 9/2007 |

OTHER PUBLICATIONS

Green, et al.; "Designing a Fast, On-line Backup System for a Log-Structured File System"; Inspec/DTJournal, vol. 8, No. 2, pp. 32-45, 1996.

IBM; "Importance Based Backups"; IP.COM/IBM TDB; Feb. 7, 2006.

Forman-et al.; "Scaling Up Text Classification for Large File Systems"; ACM Digital Library, pp. 239-250; Aug. 24-27, 2008.

Wang-et al.; "The Conquest System: Better Performance Through a Disk/Persistent-RAM Hybrid Design"; ACM Digital Library; vol. 2, No. 3 pp. 309-348; Aug. 2006.

* cited by examiner

MULTI-PHASE FILE SYSTEM RESTORE WITH SELECTIVE ON-DEMAND DATA AVAILABILITY

BACKGROUND OF THE INVENTION

1. Field of the Invention

The present invention is related to storage file systems within computer systems, and more specifically to a multi-phase system restore methodology that selectively provides on-demand data availability.

2. Description of Related Art

In large-scale computer systems, after a catastrophic event such as storage hardware failure, a total system failure, or when a software upgrade must be backed-out due to problematic changes to the operating system or other components of the software, a system restore may need to be performed. In the past, system operators and users had to wait until a complete file system restore was performed, before accessing any of the files contained in the file system. In a computer system with very large amounts of storage, the down-time associated with a system restore is significant and since operations in many organizational components of an entity may come to a halt with the file system off-line, e.g., accounting, order entry, etc., the costs associated with such system downtime can be very large.

U.S. Pat. No. 7,234,077 discloses techniques for providing on-demand access to files during a restore process, so that files within the file system can be accessed by users without waiting for the restore process to complete. However, random access of files during a restore process can be a very costly penalty, especially when the backup medium is a sequential-access medium such as magnetic tape. Therefore, a single user or program can slow down a restore process by requesting resources that require a tape unit to reposition, locate and retrieve the demanded file and then return to streaming the restore image. Further, in large storage file systems, the number of tape units may be less than the number of tapes that hold the backup image, and the requested file may be on an un-mounted tape volume, requiring a tape volume to be un-mounted, the tape containing the file mounted and then finally the original tape volume mounted again to resume the restore process. Even in a completely automated tape library, such a sequence can require several minutes to perform.

Therefore, it would be desirable to provide on-demand access to files within a file system during a restore process without introducing inordinate system delay and while supporting streaming of the file system backup image(s) from multiple volumes.

BRIEF SUMMARY OF THE INVENTION

The invention is embodied in a computer-performed method, computer program product and computer system that provides selective on-demand file availability when restoring a file system within a computer system. The computer system is a computer system executing a program for carrying out the method and the computer program product is a program for carrying out the method.

The method copies files to restore a file system and selectively interrupts the copying to retrieve a file when an on-demand access to the file is made during the restore process. The files are organized into groups of files, and the copying is performed in multiple phases corresponding to each group of files. The copying is only interrupted to perform an on-demand access according to the group currently being copied and optionally based on a permission level of an entity making the request, so that a restore of critical files is not slowed down by users accessing files that have not yet been restored.

The criteria used for grouping the files is arbitrary and is selected by the file system administrator. For example, the selected criteria may be the elapsed time since the last access to or modification of the files, the owner of the files, the file name or the full directory path. The grouping may be performed during the backup operation, which allows the data to be pre-ordered to improve the streaming of the restored data. Alternatively, the grouping may be done during the restore operation to meet the requirements of the restored file system. As another alternative, the files can be grouped during the backup operation, but filtered during the restore operation to select a subset of the files in each group. For example, the restore might restore only files belonging to the initial workload scheduled for the restored file system.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to computer backup and restore systems, and in particular to file system restore operations performed from multiple streaming devices. On-demand access to files is provided, but not arbitrary on-demand access as in previous techniques. In the present invention, certain portions of the restore process proceed while blocking or delaying on-demand access to files, which ensures that all essential files will be restored before users are permitted to slow the restore process by running applications or accessing data that require files that have not yet been restored and generating consequent on-demand requests for the required files. An administrative override may be provided that permits on-demand access to files for certain programs and/or users even during a restore phase that would otherwise block on-demand access to files. The first phase of the file restore generally includes system files and/or files known to be needed by applications that are frequently used.

Figure 1:
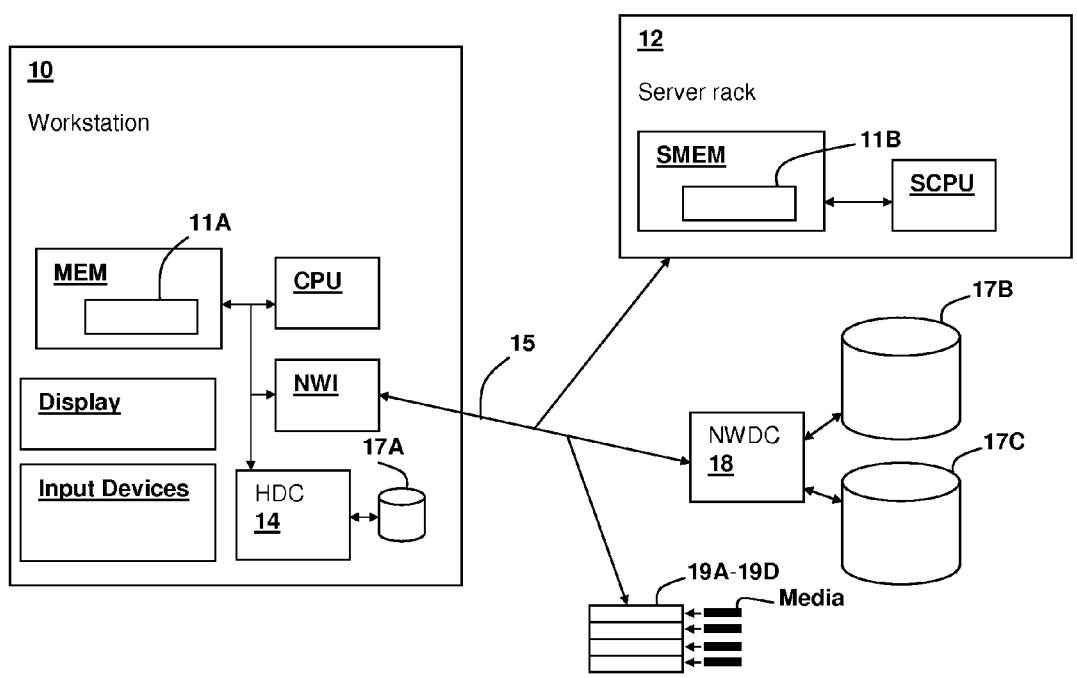
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A workstation computer system 10 includes a processor CPU coupled to a memory MEM that contains program instructions for execution by CPU, including a virtual file system (VFS) interface 11A, which provides a native file system interface to the particular operating system executed by workstation computer system 10, for example the WINDOWS operating system. Workstation computer 10 is also depicted as including a graphical display Display and input devices Input Devices, such as mice and keyboards, for interacting with user interfaces including login screens and other user interfaces for interacting with other computers connected to the network, for example, administration screens for administering selection of the assignment of files to particular restore phases used by the techniques of the present invention, and to control or edit scheduling of the backup processes and initiate the restore processes of the present invention. Workstation computer system also includes a hard disc controller HDC 14 that interfaces processor CPU to local storage device 17A and a network interface that couples workstation computer system 10 to network 15, which may be fully wireless, fully wired or any type of hybrid network. VFS interface 11A provides a uniform set of application programming interfaces (APIs) that provide access to resources, such as local storage 17A or remote storage such as storage devices 17B and 17C, which are coupled to network 15 by network disc controller (NWDC) 18.

A server rack computer system 12, having at least one server memory SMEM and a server processor SCPU is also shown coupled to network 15. A different VFS client 11B is provided and executed within server rack 12 to provide suitable native APIs for accessing storage within server rack 12, networked storage devices 17B and 17C, as well as storage device 17A within workstation computer system 10, if storage device 17A is shared. A system configuration as is generally used with the present invention will include a large number of workstation computer systems such as workstation 10 and a large number of server racks such a server rack 12. Storage within such a computer system will also generally include large arrays of storage devices. However, the techniques of the present invention are not dependent on scale and therefore can be practiced within smaller system configurations, as well. A number of backup and restore devices 19A-19D, e.g., magnetic tape drives, are coupled to network 15 for generating multiple backup/restore images on media MEDIA, such as backup tapes, as will be described in further detail below. The backup operations of the present invention can be controlled by either or both of VFS client 11A and 11B or another process executing within server rack 12 workstation computer system 10 or another system coupled to network 15 including processes executing within controllers within networked storage devices 17B and 17C.

Network 15 may include wireless local area networks (WLANs), wired local-area networks (LANs), wide-area networks (WANs) or any other suitable interconnection that provides communication between workstation computer system 10 and server rack 12, storage devices 17A-17C, and any other systems and devices coupled to network 15. Further, the present invention concerns backup and restore functionality that is not limited to a specific computer system or network configuration. Finally, the specification of workstation computer system 10 and server rack 12 and the location of their specific memory MEM and file system interface objects 11A and 11B does not imply a specific client-server relationship or hierarchical organization, as the techniques of the present invention may be employed in distributed systems in which no particular machine is identified as a server, but at least one of the machines provides an instance and functionality of a program or object that performs backup and restore operations in accordance with an embodiment of the present invention. The objects or interfaces process accesses according to methods and structures of the present invention, as described in further detail below.

Figure 2:
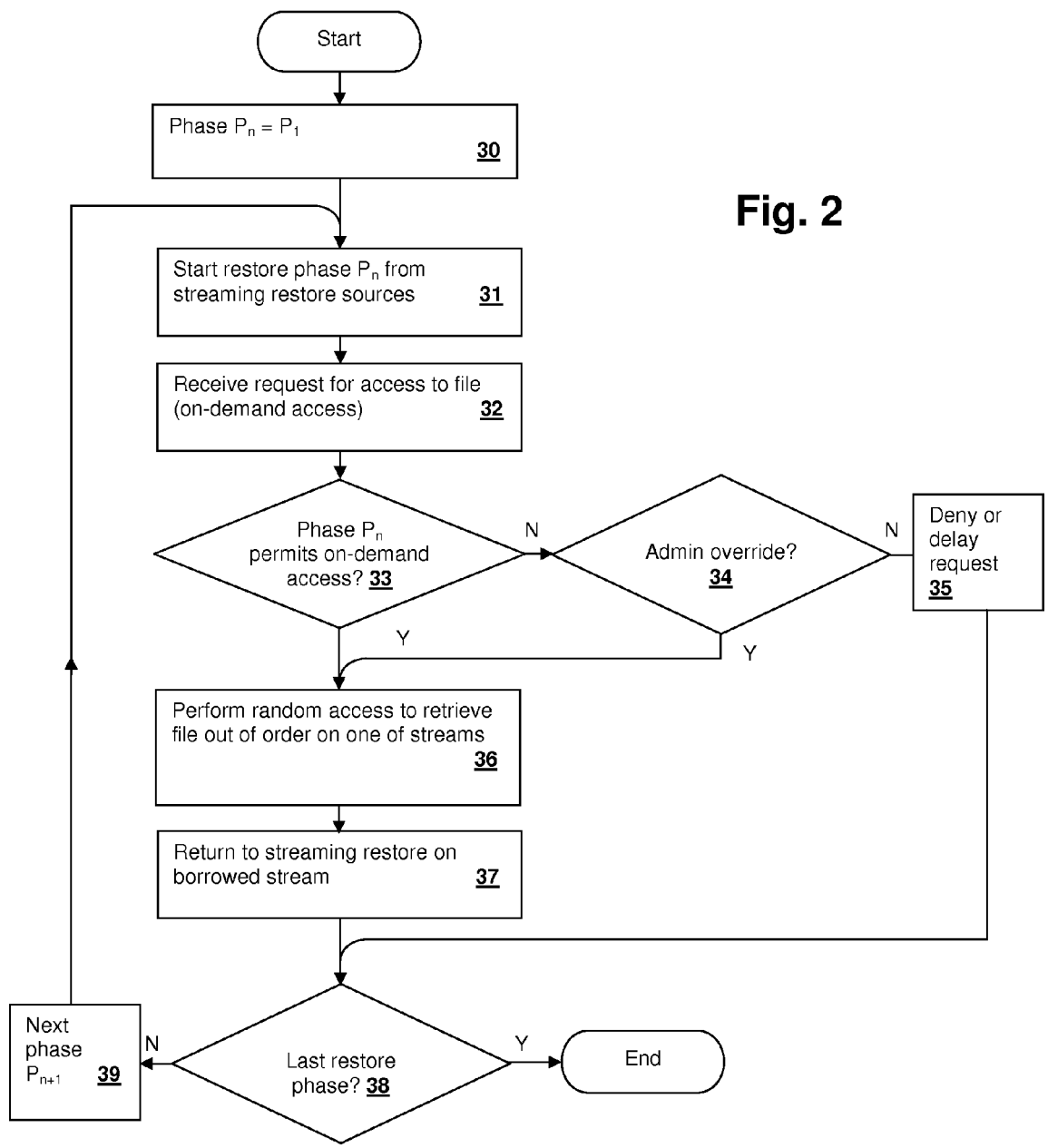
FIG. 2 is a flowchart showing a file system restore method in accordance with an embodiment of the present invention.

Referring now to FIG. 2, a file system restore method in accordance with an embodiment of the present invention is illustrated in a flowchart. In the depicted method, a restore phase $P_n$ is first set to the initial phase $P_1$ (step 30). Prior to performing the restore operation, the file system name space is restored on the storage device(s) storing the file system, and may also include restoring the file attributes including access control lists (ACLs) associated with the files. Next, restore phase $P_n$ is started from multiple streaming restore sources (step 31). During streaming of restore phase $P_n$, an on-demand access request is received for a file (step 32). If phase $P_n$ permits on-demand access (decision 33), or a permission level of the entity requesting the on-demand access is sufficient to provide an administrative override (decision 34), then a random access to retrieve the file out-of-order on one of the streams is performed on one of the devices (step 36) and then borrowed stream/device returns to streaming restore phase $P_n$ once the file has been retrieved (step 37). If phase $P_n$ does not permit on-demand access (decision 33) and there is no administrative override (decision 34), then the on-demand access request is denied or delayed until a later phase of the restore process (step 35), depending on the program interface design. In either case, the on-demand access request can be re-asserted in a subsequent phase that will permit on-demand access, if the file has not already been restored at that time. Until the last restore phase $P_n$ is completed (decision 38), phase $P_n$ is set to next phase $P_{n+1}$ (step 39), and steps 31-39 are repeated.

Figure 3:
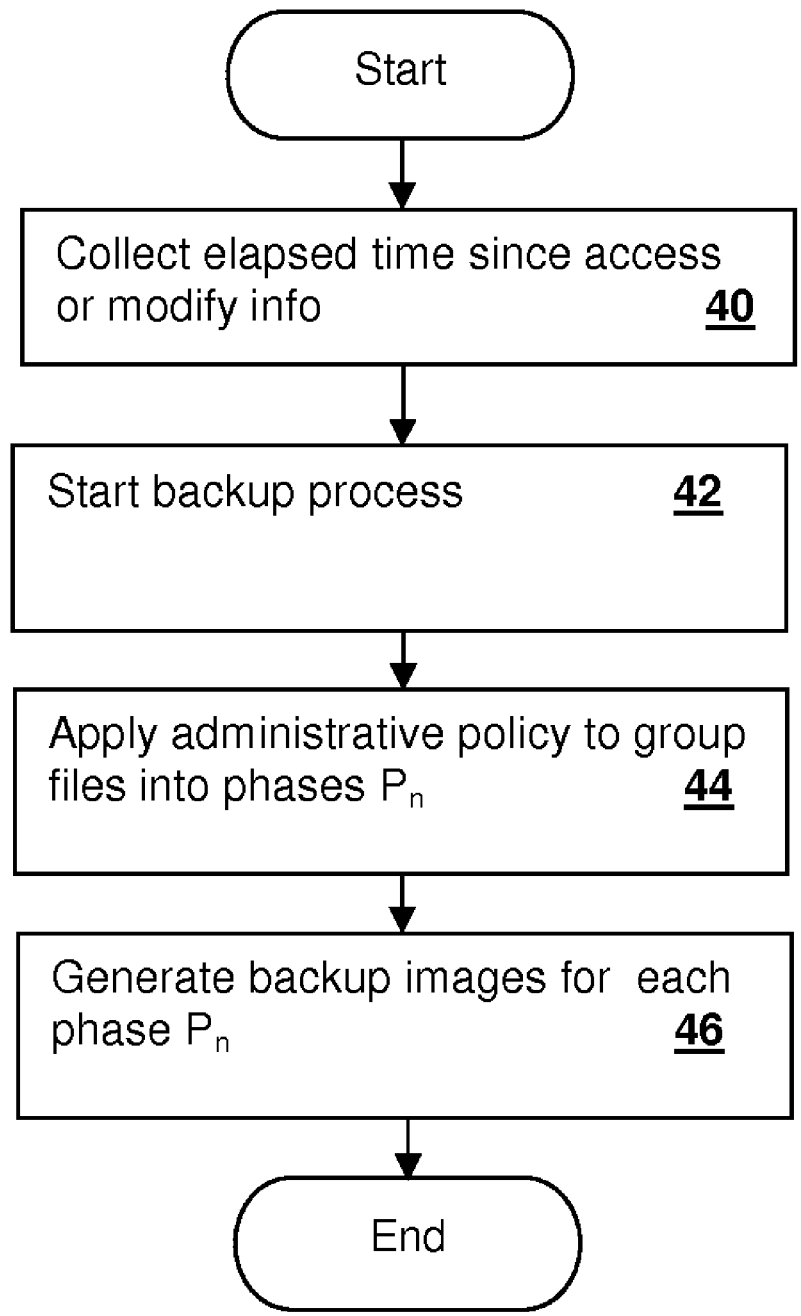
FIG. 3 is a flow chart of a file system backup method in accordance with an embodiment of the present invention.

While the process depicted in FIG. 2 assumes that files are previously assigned to the various restore phases $P_n$ and it is advantageous to do so because the files can be arranged in order within the restore images, it is possible to select the files for each phase during the restore. For example, as illustrated in FIG. 3, which depicts another method in accordance with an embodiment of the invention, the restore may be performed from a continuous set of restore images, one corresponding to each of backup and restore devices 19A-19D with the phases determined on-the-fly during the restore process, which may be according to file counts, an elapsed system time since the restore began or by observing file characteristics such as the time elapsed since modification or access as is alternatively used to partition the file system restore in phases $P_n$ during backup as described above (step 40). The restore phases can also be partitioned according to files needed execute particular applications and or partitioned according to other policy decisions that specify which files are more critical than others. The policies may be implemented in a policy language if the VFS includes such a feature. Once the information needed to apply the phase assignment policies has been gathered, for example, as a list of files to be backed up for each phase $P_n$, the backup process is commenced (step 42) and the administrative policy is applied to group the files into phases $P_n$ (step 44). Then, backup images for each phase $P_n$ are generated (step 46), which will also generally be multiple backup images for restoring via multiple backup devices. Therefore, each tape or other backup media will contain an image having a portion of the files for each phase $P_n$ so that the files for each phase $P_n$ can be streamed from the multiple devices, increasing the speed at which the file system can be restored.

As mentioned above, if the backup process generates information that groups the files into phases $P_n$, as opposed to determining the phases $P_n$, on-the-fly during the restore process, then the backup process can also order the files on the tape or other media read by backup and restore devices 19A-19D to improve streaming during the restore process. Also as mentioned above, the backup process can generate a single file system image that is striped across the multiple media volumes, or the backup process can partition the files for each phase across the multiple media volumes. In addition to the phasing of file copies/file restore, attributes of the files may also be restored in phases. For example, attributes that may be quickly set without encountering long delays, e.g., attributes that are set in a file inode, may be set during the phase in which the files themselves are copied, while the setting of extended attributes that are stored separately is delayed until a later phase and in some embodiment, until all of the files have been copied.

Finally, it is not necessary to run a complete restore process in order to practice the techniques of present invention. For example, an administrator may choose to restore only one restore phase such as phase $P_1$ to restore critical files, and permit the remainder of the files to be restored via on-demand access requests. In particular, systems that employ a hierarchical storage manager generally do not include enough reserved hard drive space to store all of the data that is potentially available to the system. Therefore, the phased restore of the present invention can be used to restore a state, that while not exactly the file system state at the time the restore event was necessitated, generally includes the same frequently accessed files, while letting other files be loaded in an on-demand fashion from tape media. The grouping of the files into restore partitions may also be used for "batch" processing, so that the files selected for a particular restore phase match the batch job that will be run after the particular restore phase has been completed, rather than a batch job that was running when the backup was made or when the file system was lost or damaged, necessitating the restore. The particular files needed for the next batch job might not have been recently accessed or modified when the previous backup was generated, but can be identified in the overall backup and selectively restored according to the necessity of these files for the next batch job.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for restoring a file system within a computer system, the method comprising:
   copying files to a storage containing the file system from one or more backup devices, wherein the copying is performed in multiple phases corresponding to groups of the files, wherein the copying streams the individual groups of the files in the corresponding phase in one or more file streaming operations that stream at least a portion of the groups from corresponding ones of the backup devices;
   receiving an on-demand access request from an entity to access a file within the file system, wherein the file is a file within a particular one of the groups;
   responsive to receiving the on-demand access request, determining whether or not to interrupt one of the file streaming operations to restore the file, wherein the determination is made selectively in dependence on which of the groups of files is currently being copied by the copying;
   in response to determining to interrupt one of the file streaming operations, selecting one of the backup devices on which to halt streaming, stopping streaming on the backup device and copying at least a portion of the file from the selected backup device to the storage; and
   in response to determining not to interrupt one of the file streaming operations, continuing the one or more file streaming operations, whereby the on-demand access request is delayed or denied.

2. The computer-performed method of claim 1, further comprising prior to the copying, initializing the groups of files according to an administrative policy that groups the files into at least a first group of files expected to be needed to resume use of the computer system and at least a second group of files that are less critical than the files in the first group of files, and wherein the determining always determines not to interrupt the one of the file streaming operations while the copying is copying the first group of files.

3. The computer-performed method of claim 2, wherein the initializing comprises:
   ranking files according to an administratively selected criteria; and
   organizing the files into the groups of files corresponding to the multiple phases, such that files more recently accessed or changed are placed in a group that is restored earlier than another group of files less recently accessed or changed.

4. The computer-performed method of claim 3, wherein the ranking and organizing are performed during a previous backup process, and wherein the files are organized on the one or more backup devices according to a result of the ranking and the organizing.

5. The computer-performed method of claim 1, wherein the determining further comprises determining if a previous one of the multiple phases has been completed, wherein the previous one of the multiple phases is a critical phase during which on-demand access to files within the file system is prevented, and wherein the determining only determines to interrupt one of the file streaming operations in response to determining that the previous one of the multiple phases has been completed.

6. The computer-performed method of claim 5, wherein the determining further comprises determining if a permission level of the entity is sufficient to permit on-demand access during the current phase, and wherein the determining whether or not to interrupt one of the file streaming operations only determines to interrupt one of the file streaming operations in response to determining that the permission level of the entity is sufficient.

7. The computer-performed method of claim 1, wherein the determining further comprises determining whether the file is a member of a group currently being restored by the copying, and wherein the determining only determines to interrupt one of the file streaming operations if the file is a member of the group currently being restored by the copying.

8. A computer system, comprising:
   a processor for executing program instructions; and
   a memory coupled to the processor for storing the program instructions, wherein the program instructions include program instructions for restoring a file system within the computer system, wherein the program instructions comprise program instructions for,
   copying files to a storage containing the file system from one or more backup devices, wherein the copying is performed in multiple phases corresponding to groups of the files wherein the copying streams the individual groups of the files in the corresponding phase in one or more file streaming operations that stream at least a portion of the groups from corresponding ones of the backup devices, receiving an on-demand access request from an entity to access a file within the file system, wherein the file is a file within a particular one of the groups, responsive to receiving the on-demand access request, determining whether or not to interrupt one of the file streaming operations to restore the file, wherein the determination is made selectively in dependence on which of the groups of files is currently being copied by the copying, in response to determining to interrupt one of the file streaming operations, selecting one of the backup devices on which to halt streaming, stopping streaming on the backup device and copying at least a portion of the file from the selected backup device to the storage, and in response to determining not to interrupt one of the file streaming operations, continuing the one or more file streaming operations, whereby the on-demand access request is delayed or denied.

9. The computer system of claim 8, wherein the program instructions further comprise program instructions for initializing the groups of files according to an administrative policy that groups the files into at least a first group of files expected to be needed to resume use of the computer system and at least a second group of files that are less critical than the files in the first group of files, wherein the program instructions for initializing are executed prior to the program instructions for copying, and wherein the program instructions for determining always determines not to interrupt the one of the file streaming operations while the copying is copying the first group of files.

10. The computer system of claim 9, wherein the program instructions initializing further comprise program instructions for:

ranking files according to an administratively selected criteria; and organizing the files into the groups of files corresponding to the multiple phases, such that files more recently accessed or changed are placed in a group that is restored earlier than another group of files less recently accessed or changed.

11. The computer system of claim 10, wherein the program instructions for ranking and organizing are executed during a previous backup process, and wherein the files are organized on the one or more backup devices according to a result of the ranking and the organizing.

12. The computer system of claim 8, wherein the program instructions for determining further comprise program instructions for determining if a previous one of the multiple phases has been completed, wherein the previous one of the multiple phases is a critical phase during which on-demand access to files within the file system is prevented, and wherein the program instructions for determining only determine to interrupt one of the file streaming operations in response to determining that the previous one of the multiple phases has been completed.

13. The computer system of claim 12, wherein the program instructions for determining further comprise program instructions for determining if a permission level of the entity is sufficient to permit on-demand access during the current phase, and wherein the program instructions for determining only determine to interrupt one of the file streaming operations in response to having determined that the permission level of the entity is sufficient.

14. The computer system of claim 8, wherein the program instructions for determining further comprise program instructions for determining whether the file is a member of a group currently being restored by the copying, and wherein the program instructions for determining only determine to interrupt one of the file streaming operations only if the file is a member of the group currently being restored by the copying.

15. A computer program product comprising a computer-readable storage device storing program instructions for execution by a computer system, wherein the program instructions include program instructions for restoring a file system within the computer system, wherein the program instructions comprise program instructions for:

copying files to a storage containing the file system from one or more backup devices, wherein the copying is performed in multiple phases corresponding to groups of the files, wherein the copying streams the individual groups of the files in the corresponding phase in one or more file streaming operations that stream at least a portion of the groups from corresponding ones of the backup devices;

receiving an on-demand access request from an entity to access a file within the file system, wherein the file is a file within a particular one of the groups;

responsive to receiving the on-demand access request, determining whether or not to interrupt one of the file streaming operations to restore the file, wherein the determination is made selectively in dependence on which of the groups of files is currently being copied by the copying;

in response to determining to interrupt one of the file streaming operations, selecting one of the backup devices on which to halt streaming, stopping streaming on the backup device and copying at least a portion of the file from the selected backup device to the storage; and in response to determining not to interrupt one of the file streaming operations, continuing the one or more file streaming operations, whereby the on-demand access request is delayed or denied.

16. The computer program product of claim 15, wherein the program instructions further comprise program instructions for initializing the groups of files according to an administrative policy that groups the files into at least a first group of files expected to be needed to resume use of the computer system and at least a second group of files that are less critical than the files in the first group of files, wherein the program instructions for initializing are executed prior to the program instructions for copying, and wherein the program instructions for determining always determines not to interrupt the one of the file streaming operations while the copying is copying the first group of files.

17. The computer program product of claim 16, wherein the program instructions initializing further comprise program instructions for:

ranking files according to an administratively selected criteria; and organizing the files into the groups of files corresponding to the multiple phases, such that files more recently accessed or changed are placed in a group that is restored earlier than another group of files less recently accessed or changed.

18. The computer program product of claim 17, wherein the program instructions for ranking and organizing are executed during a previous backup process, and wherein the files are organized on the one or more backup devices according to a result of the ranking and the organizing.

19. The computer program product of claim 15, wherein the program instructions for determining further comprise program instructions for determining if a permission level of the entity is sufficient to permit on-demand access during the current phase, and wherein the program instructions for determining only determine to interrupt one of the file streaming operations in response to having determined that the permission level of the entity is sufficient.

20. The computer program product of claim 19, wherein the program instructions for determining further comprise program instructions for determining if a permission level of the entity is sufficient to permit on-demand access during the current phase, and wherein the program instructions for determining only determine to interrupt one of the file streaming operations in response to having determined that the permission level of the entity is sufficient.

21. The computer program product of claim 15, wherein the program instructions for determining further comprise program instructions for determining whether the file is a member of a group currently being restored by the copying, and wherein the program instructions for determining only determine to interrupt one of the file streaming operations only if the file is a member of the group currently being restored by the copying.

* * * * *